(12) United States Patent
Ducellier et al.

(10) Patent No.: US 6,327,280 B1
(45) Date of Patent: Dec. 4, 2001

(54) CUSTOM OPTICAL FILTERS

(75) Inventors: Thomas Ducellier; Vincent Delisle, both of Ottawa (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/305,673

(22) Filed: May 5, 1999

(30) Foreign Application Priority Data

May 5, 1998 (CA) .................................................... 2236789
May 26, 1998 (CA) .................................................... 2238544

(51) Int. Cl.[7] ........................................................ H01S 3/10
(52) U.S. Cl. ................................ 372/20; 372/98; 372/142
(58) Field of Search ........................... 372/102, 20, 98; 356/333

(56) References Cited

U.S. PATENT DOCUMENTS

| | | | |
|---|---|---|---|
| 5,233,405 | * 8/1993 | Wiuldnauer et al. | 356/333 |
| 5,594,744 | 1/1997 | Lefevre et al. | 372/20 |
| 5,808,759 | 9/1998 | Fukushima | 385/140 |

* cited by examiner

Primary Examiner—Leon Scott, Jr.
(74) Attorney, Agent, or Firm—Neil Teitelbaum

(57) ABSTRACT

This invention relates generally to custom optical filters such as filters relating to, flat-top WDM multiplexer/demultiplexers, flat-top and peaky comb filters or reconfigurable add & drop filters. The embodiment disclosed below is based on mid-dispersion wavelength bands processing, wherein the optical spectrum is dispersed in two steps; in-between these two steps, the wavelength bands are manipulated in the focal plane, for example by being moved, reflected, absorbed, inverted, magnified or reduced to achieve a particular result. A masked mirror or masked transmissive element selects wavelength by position. The mask shape for relatively complex filtering functions is much simpler than currently used for collimated beams because of the correlation between position and wavelength. Inversion of channel bands or movement of channel bands in two dimensions in the focal plane, in particular, enables the construction of numerous useful devices. It is possible to realize custom flat-top optical filters, custom shaped optical filters, flat-top WDM multiplexer/demultiplexers, flat-top and peaky comb filters or reconfigurable add & drop filters.

19 Claims, 11 Drawing Sheets

LITTROW

METCALFE f: FOCAL LENGTH OF THE LENS
d=0 (A GAP HAS BEEN INTRODUCED FOR THE CLARITY OF THE DRAWING)

CUSTOM OPTICAL FILTERS

FIELD OF THE INVENTION

This invention relates generally to custom optical filters for providing selected wavelength characteristics for use in WDM systems, particularly filters relating to: flat-top WDM mux/demux, flat-top and peaky comb filters or reconfigurable add & drop filters.

BACKGROUND OF THE INVENTION

In the prior art cascaded diffractive elements have been used to increase diffractive efficiency. In addition processing of the beam between diffractive elements is also used. However, processing has been done in the far field. Processing in the far field, where the beam is collimated, and is a Fourier transform of the original beam, makes optical processing of individual or selected wavelengths or channels very complex and difficult, requiring computer processing holographically. Generally the prior art far field processing is used for global processing, to all wavelengths, since local processing of individual wavelength bands is difficult.

An application of optical filtering in the far field of a dispersed beam is disclosed in U.S. Pat. No. 5,805,759 issued to Fujitsu Limited, Sep. 9, 1998. This application discloses an optical equalizer comprising an attenuating filter between two dispersion gratings. Light is processed as a collimated beam. The attenuator introduces variable attenuation primarily to compensate for gain tilt from amplifiers. One hundred percent attenuation can be selectively arranged using metalized blocking strips. Because filtering is performed on the collimated beam, obtaining sufficient wavelength separation is more difficult. It requires high dispersion and long distances between the gratings. The size requirements makes the proposed device impractical for use. Further, working at high dispersion causes greater sensitivity to polarization. Filtering as taught by the Fujitsu application only involves attenuation at varying levels within a dispersed beam. Displacement of the dispersed wavelength bands is not contemplated. The Fujitsu patent does not teach more complex processing achieved by displacing wavelength bands in the focal plane, which can be achieved in a compact device by processing focused wavelength bands in the focal plane.

The present invention has found that optical processing, particularly of selected wavelengths, is more easily accomplished in the focal plane where the wavelengths are more easily separated within a compact space and can be physically processed or moved without complex calculation. In the focal plane position can be correlated to wavelength. This can be used to provide filtering for complex systems. It is often desired to redirect selected wavelengths for add/drop application, or to shift or invert wavelength bands for flat top or other specialized response profiles not possible through simple attenuation.

Simple focal plane optical processing is disclosed in U.S. Pat. No. 5,223,405 issued in 1993 to Hewlett-Packard Company. This reference discloses the use of a slit to permit a selected portion or wavelength band of a dispersed light beam from a diffraction grating to pass. The selected portion of the light beam is then redirected to the diffraction grating to be recombined in order to pass to an output for spectral analysis. The isolation of a selected wavelength band is important for wavelength monitoring and spectral analysis. However, the method and apparatus taught by the Hewlett-Packard reference does not suggest the controlled filtering of multiple discrete wavelengths and varying intensities or multiple inputs which can be achieved by processing the dispersed light in the focal plane.

SUMMARY OF THE INVENTION

The present invention has found that more complex processing in the focal plane can be achieved for custom filtering and multiple simultaneous filtering can be achieved. This processing may include local channel inversion, global inversion of the signal, location shifts of selected wavelengths, and two dimensional multiple simultaneous filtering.

Accordingly, the present invention provides an optical filter comprising:

at least one input light beam comprising multiple wavelengths;

a first dispersive element for dispersing a spectrum of the at least one input light beam;

a processing element in the focal plane of the spectrum of the at least one input light beam for selectively processing a plurality of wavelength bands wherein the intensity and wavelength order vary in a predetermined manner;

dispersive means selected from the first dispersive element and a second dispersive element for providing a second dispersion of the processed wavelength bands for condensing the processed wavelength bands or for redispersing the processed wavelength bands; and, at least one output for receiving output light from the dispersive means.

A further embodiment in accordance with the present invention provides a tunable laser comprising:

a tunable filter cavity including
  an input light beam,
  a lens for focusing light from the input source;
  a dispersion grating for dispersing an input light beam spectrum; and
  a processing element in the focal plane for transmitting a selected wavelength band of the spectrum including a corner cube retro-reflector having an axis parallel to lines of the dispersion grating for redirecting light to the dispersion grating, through the lens to the input light source;

an amplifying medium a mirror;

a filter input coupled to the laser and aligned with the input light source with reference to the lines of the dispersion grating, for filtering the wavelength of the tunable laser; and means for separating a filtered output from the filter input light.

Accordingly a method of the present invention comprises a method of providing optical filtering comprising the steps of:

dispersing an input beam of light comprising a plurality of wavelengths;

selecting a plurality of specific wavelength bands at the focal plane for processing to provide predetermined intensities and wavelength order for subsequent dispersion;

dispersing the plurality of selected wavelength bands to recondense or redisperse the selected wavelength bands.

Advantageously, precise and complex filtering can be achieved for numerous applications using a relatively simple filter device. A further advantage is that by processing focused wavelength bands having a separation of tens of microns, a compact, practical device of only a few inches can be constructed.

Additional advantages will be apparent to persons of skill in the art from the detailed description of preferred embodiments together with the following drawings which illustrate preferred embodiments by example only:

BRIEF DESCRIPTION OF THE FIGURES

FIG. 5b is a schematic illustration of a masked mirror to produce the filter response of FIG. 5a;

FIG. 6b is a schematic illustration of a masked mirror to produce the filter response of FIG. 6a;

FIG. 6c is a graphic illustration of an improved filter response over FIG. 6a;

FIG. 9b is a graphic simulation of the intensity response vs. wavelength from the embodiment of FIG. 9a;

FIG. 9c is a graph of experimental data of a configuration in accordance with FIG. 9a;

FIG. 10b is a partial schematic illustration of the mask and retro-reflector of FIG. 10a;

FIG. 11b is a schematic illustration of the focal plane only of FIG. 10a;

Like numerals are used throughout to depict like elements.

DETAILED DESCRIPTION OF PREFERRED EMBODIMENTS

The present invention is based on mid-dispersion wavelength band processing, wherein the optical spectrum is dispersed in two steps; between these two steps, the wavelength bands are manipulated in the focal plane. The manipulation or signal processing may include, for example being moved, reflected, absorbed, inverted, magnified or reduced to achieve a particular result. It is possible, for example, to realize custom flat-top optical filters, custom shaped optical filters, flat-top WDM mux/demultiplexors, flat-top and peaky comb filters, reconfigurable add & drop filters, multiple simultaneous filters or tunable laser devices.

The dispersion can be provided by use of dispersive elements such as a grating, prism, phased array waveguides or any other known ways of dispersing the spectrum. Embodiments in accordance with the invention make use of two dispersive elements, or a single dispersive element, wherein a double pass configuration is described. The processing of the wavelengths can be made in the space domain, if the beams are focused. This latter option is preferred. For clarity and ease of explanation, all the schemes will be described with the supposition that the diffracting element is a grating, and that the beams are focused by a lens (not shown in all instances). The grating arrangement will be either Littrow or Metcalfe.

Figure 1A:
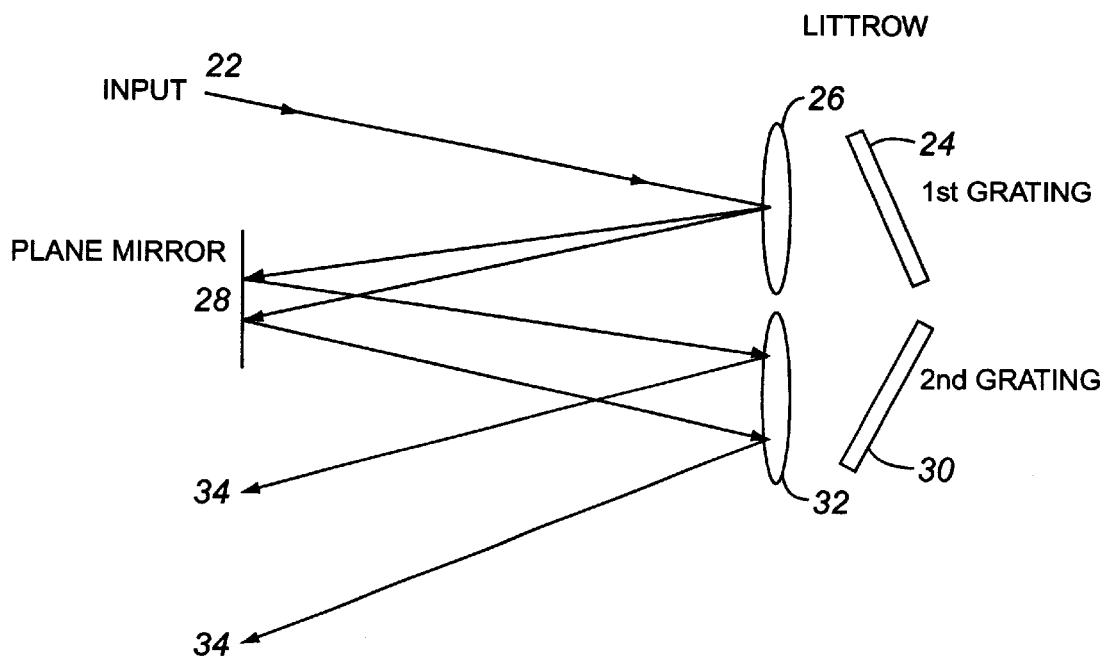
FIG. 1 is a schematic illustration of a double pass grating in Littrow configuration for use in accordance with the present invention.

FIG. 1a illustrates a double pass grating in Littrow configuration with a lens to focus the beams. This scheme will be used to explain the basic process, and the construction of a specific example of flat-top optical filter. The configuration 20 generally includes an input port 22, a first grating 24 with a necessary focusing lens 26, a mirror 28 or other transmission element in the focal plane, a second grating 30 and focusing lens 32 and an output port 34. A beam of multiple wavelengths is directed from the input 22 to the first grating 24 which disperses the beam into wavelength bands. The mirror or transmission element 28 receives the wavelength bands at the focal plane and directs the light to the second grating 30. Depending on the order of the second grating 30, the light is recondensed to a single output port 34 or dispersed a second time to multiple output locations 34.

Figure 1B:
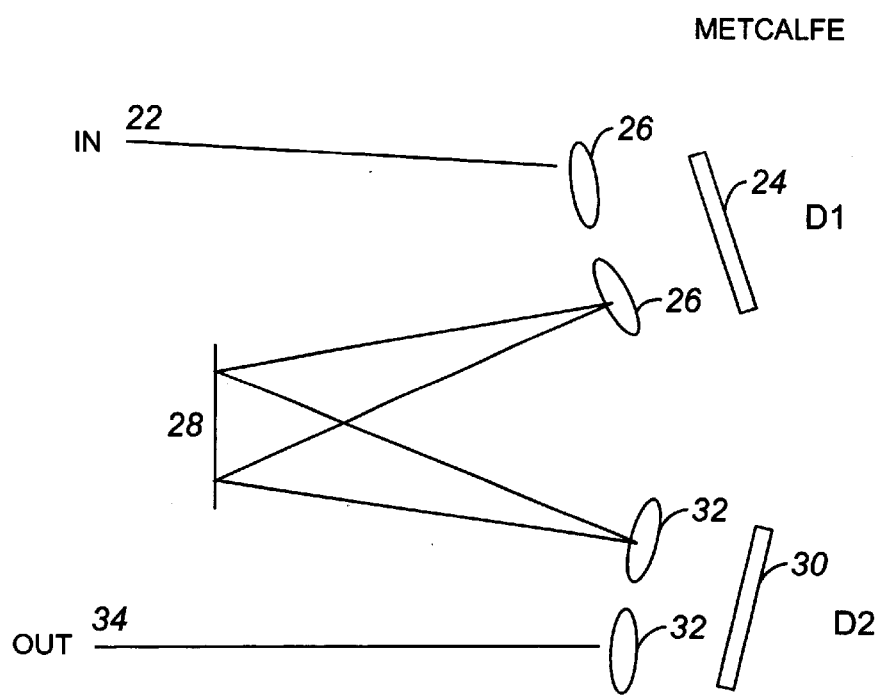

FIG. 1b illustrates a double pass grating in Metcalfe configuration. The configuration is quite similar with the added necessary second lenses 26, and 32. Both configurations can be made using one or two gratings.

The invention is based on a double-pass grating approach: wherein the following ordered steps are performed:
  a) dispersing the spectrum;
  b) performing processing in the focal plane of the wavelength bands; and,
  c) recondensing or dispersing the wavelengths again in the second pass.

The basic 'processing' at the focal plane that the wavelength bands can experience includes: inversion of local wavelength bands or of the global spectrum; absorption; reflection (i.e. no change in the spots size or location); and magnification/reduction. Since processing occurs once the wavelengths are dispersed and focused in the focal plane, any physical modification or displacement is in fact modifying the wavelength bands themselves.

A masked mirror 28 with a pattern corresponding to the desired response is made so that where a desired wavelength must pass back to the second grating, there is a reflective stripe, and where selected wavelengths should be blocked, there is no reflective material.

In order to block the unwanted wavelength band, the substrate of the mirror can be anti-reflection coated or alternatively some deflecting Vs 36 (shown in FIG. 4) may be ruled between the reflective stripes to deflect the unwanted bands. With Vs 36 ruled between the reflective stripes, having for example 60 degree pitch, light of unwanted wavelength bands is deflected by 30 degrees, and is lost because it does not return to the lens. The patterned mirror 28 is placed in the focal plane of a double-pass grating configuration.

Figure 2:
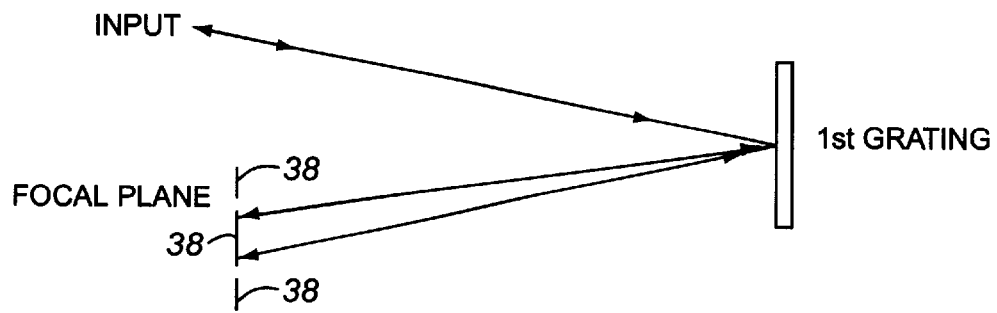
FIG. 2 is a simplified schematic of a double pass grating in Metcalfe configuration using a non-continuous mirror at the focal plane for wavelength selection.
Figure 3A:
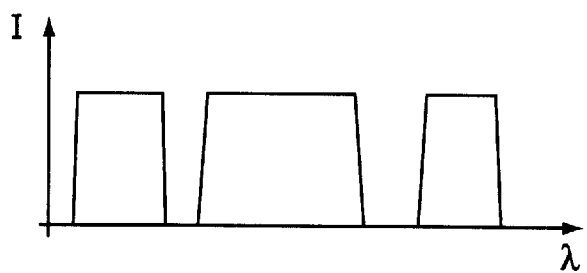
FIG. 3a is a graphic simulation of the intensity response vs. wavelength from the embodiment of FIG. 2.

An example in FIG. 2 illustrates that if only some portions of the spectrum are reflected back to the grating for a second dispersion step, by using a mirror 28 having a particular signature wherein certain portions reflect and other portions absorb or transmit incident light, a multiple band-pass filter is realized. Reflective stripes 38 reflect the selected desired wavelength bands. A graph of the resulting intensity response versus wavelength is shown in FIG. 3.

Figure 3B:
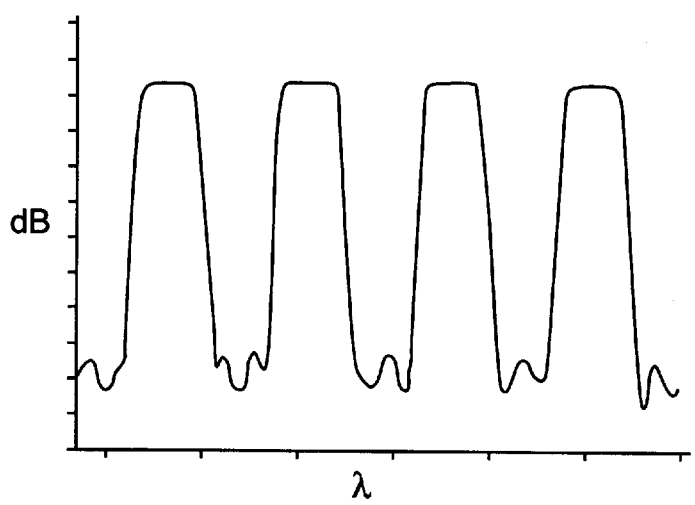
FIG. 3b is a graph of experimental results of the configuration of FIG. 2.
Figure 3C:
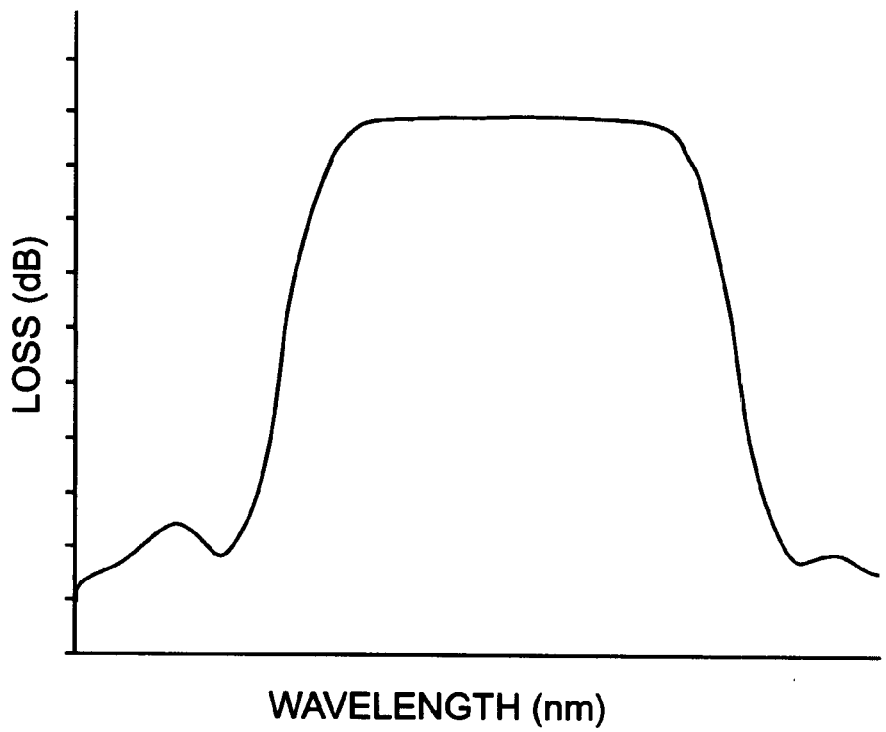
FIG. 3c is a enlarged view of a portion of the graph of FIG. 3b.

This has been experimentally verified. A 100 Ghz flat-top comb filter has been obtained, with 50 $\mu$m mirror slits. The slits were deposited directly on glass, with no anti-reflection coating, as a result a contrast of −14 dB was observed. The theoretical limit is far lower, in the range of 40–50 dB. The flatness is exceptional: the 1 dB bandwidth is 603 pm, whereas the 3 dB bandwidth is 692 pm, as seen in graphs FIGS. 3b and 3c showing intensity in dB vs. wavelength in nm. This kind of device can be used for 1:2 channel selection. Other applications include a reconfigurable flat-top add & drop.

Figure 4:
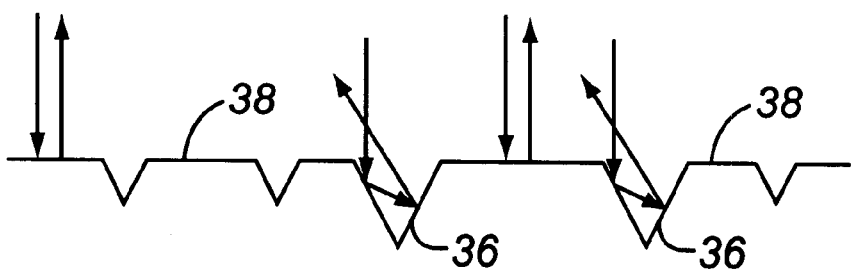
FIG. 4 is a cross-sectional view of a wavelength selective mirror having v-grooves for redirecting rejected wavelength bands.

The mirror 28 can be easily patterned in a number of ways, for example stripes of mirrors deposited on a substrate can slice the spectrum in bands. The unwanted bands could be absorbed, or reflected to a different location. Shown in FIG. 4 is a mirror 28 with selected v-grooves 36 of an angle to deflect unwanted wavelength bands such that the light does not return to the lens. Reflective bands 38 reflect the desired wavelength bands.

Figure 5A:
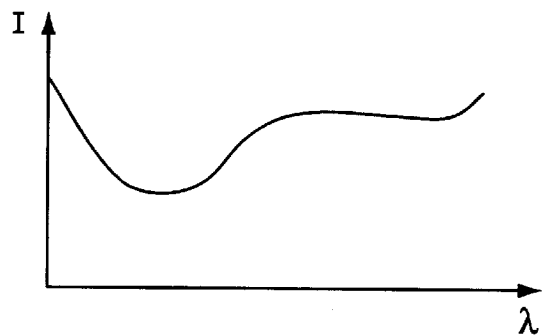
FIG. 5a is a graphic illustration of an irregular filter response.
Figure 5B:
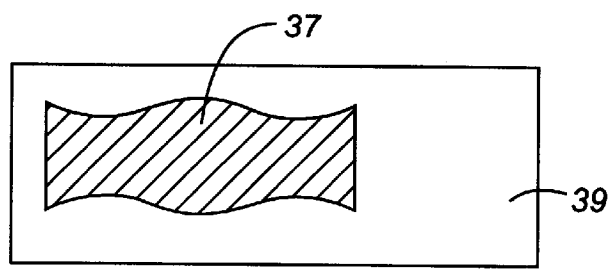

Due to the relatively simple correlation between position and wavelength for processing in the focal plane, very specific or irregular shapes of optical filters are possible by controlling the reflective pattern. The mask can be made for instance by photolithography on Silicon. The patterned mirror 28 can also be a patterned transmissive element 28 between gratings 24, 30 which would similarly select desired wavelength bands or portions of wavelength bands to control intensity by position and block unwanted bands. A complex filter response might be desired, for example, for EDFA gain flattening purposes, as shown in FIG. 5a. A corresponding masked mirror, shown in FIG. 5b illustrates an irregular reflective shape 37 on a transmissive substrate 39, to give the intensity variation of the desired filter response.

Figure 6A:
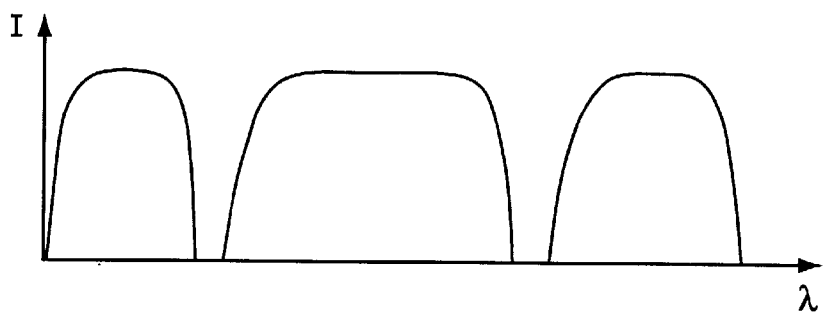
FIG. 6a is a graphic illustration of a filter response.
Figure 6B:
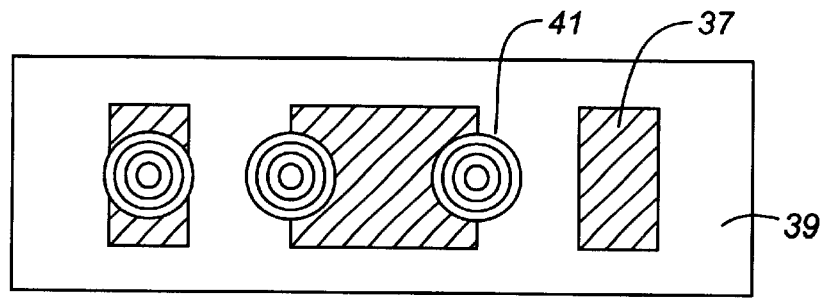
Figure 6C:
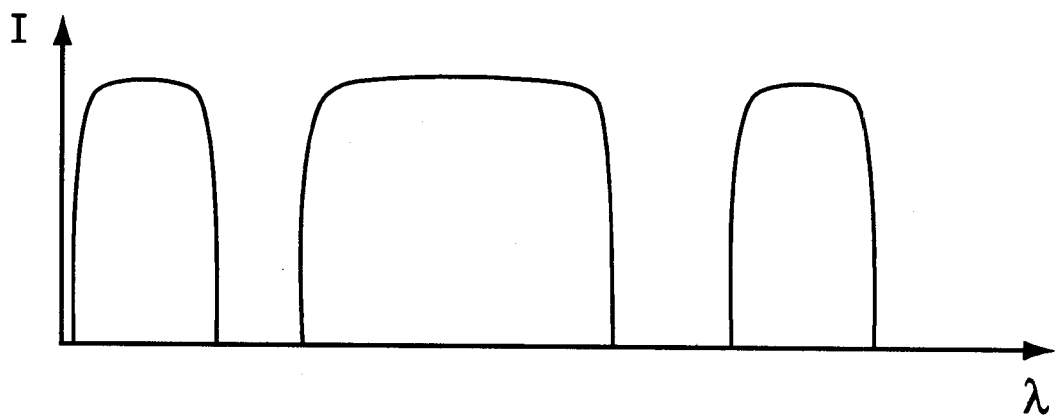
Figure 6D:
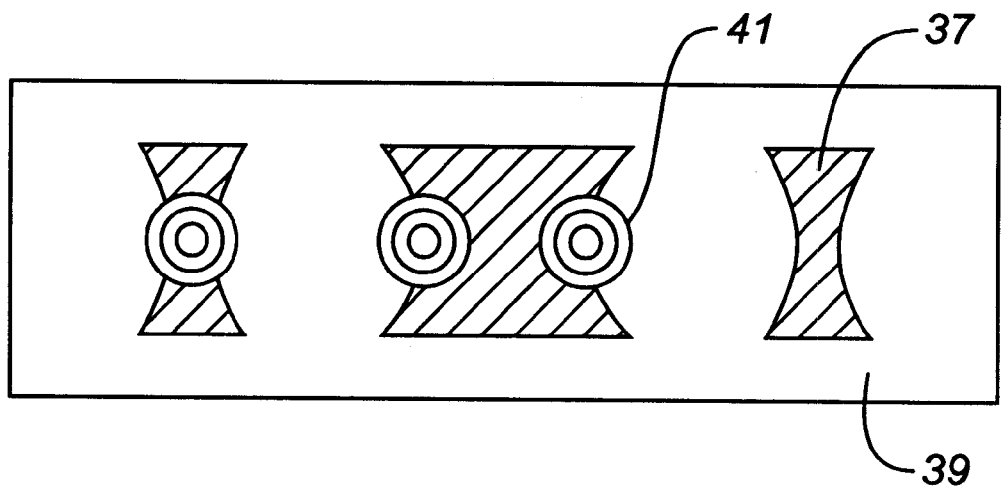
FIG. 6d is a schematic illustration of a masked mirror to produce the filter response of FIG. 6c.

The mirror 28 may include absorptive sections to mimic the desired shape, or the reflective stripes may have varying widths and shapes so that only a portion of the light in selected wavelengths and at selected intensity levels is reflected. The use of overlap integral calculations assist to define the best profile. Only a fraction of the mode field overlaps with the reflective patterns, therefore an absorption dependent on the physical location of the wavelength bands is realized. To improve the response profile, for instance to increase the steepness for a mirrored pattern of stripes comprising a custom flat-top optical bandpass filter, the steepness of the transfer function is (given by the overlap integral between the mode field and the stripes. The mode field overlap is depicted at 41 shown in FIG. 6b. A graph of the filter response is illustrated in FIG. 6a showing rounded passband profiles. FIG. 6d illustrates a modified mask 37 to compensate for the mode field overlap. It is possible to design a custom stripe profile to provide precise filter response. An improved response is shown graphically in FIG. 6c. This necessitates optimizing the overlap integral between the mirror stripes and the mode field so that the transition between the wavelength bands hitting the mirror and the wavelength bands not hitting it anymore are the steepest. This type of compensation can be readily determined by one skilled in the art.

Figure 7A:
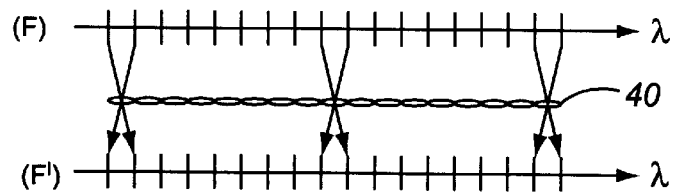
FIG. 7a is a schematic illustration of an array of microlenses to divide and invert wavelength bands in the focal plane in transmission.
Figure 7B:
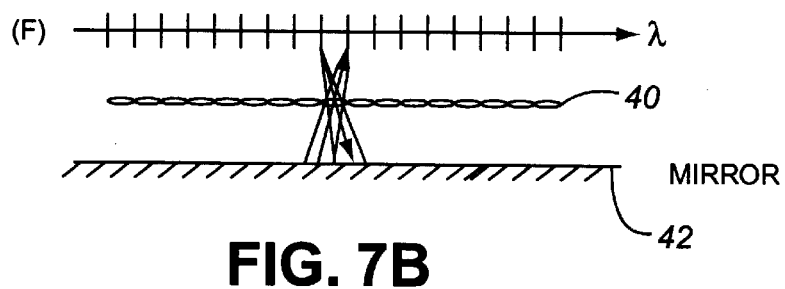
FIG. 7b is a schematic illustration of an array of microlenses to divide and invert wavelength bands in the focal plane in reflection.
Figure 7C:
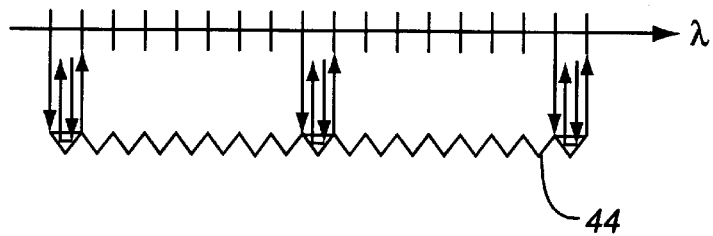
FIG. 7c is a schematic illustration of an array of 90 degree v-groove micro-mirrors to divide and invert wavelength bands in the focal plane in reflection.

Local processing of wavelength bands in the focal plane can be accomplished using an array of micro-lenses to slice the wavelength bands in the focal plane and invert these individual bands about a center wavelength, either in transmission or reflection. FIG. 7a illustrates an array of micro-lenses 40 for use in transmission. FIG. 7b illustrates a similar array 40 for use in reflection with a plane mirror 42. An array of micro retroreflector prisms 44, such as 90 degree v-grooves shown in FIG. 7c, can similarly be used to slice the wavelength bands and invert them in reflection.

Inversion within individual wavelength or channel bands prior to the second dispersion step leads to dispersion nulling, and as a result a flat-toping response for each inverted channel band. A flat top WDM mux/demux device is further discussed in copending U.S. application Ser. No. 09/271,879 filed Mar. 18, 1999, by the same inventors.

Further processing may also be performed to the entire spectrum. For example, one may want to invert the spectrum completely to null to total dispersion in double pass configuration. To do so, a large retroreflector prism such as a corner cube, Dove, etc. can be used or alternatively a large lens, for example, a quarter pitch Selfoc lens with a mirror at its back, or any kind of lens with a mirror at its focal image plane can be used.

The method in accordance with the invention is based on the following successive steps: a first dispersion of spectrum D1; global and/or local wavelength processing; and a second dispersion D2. D1 & D2 can be done with the same grating in double pass configuration, or with two cascaded gratings. As gratings can be manufactured in perfectly matched pairs, the dispersion D1 and D2 can be nearly identical. Dispersion by two gratings with a simple reflection by a plane mirror between them causes the total dispersion to be D1−D2. Whereas if the process includes globally inverting the spectrum before the second dispersion, the dispersion is added, D1+D2. The same rule applies to inversion in small wavelength bands. It is possible to obtain a peaky response using a device designed such that D1+D2<>0. For a flat-top response, the device should be designed such that D1+D2=0.

If D1 and D2 are caused by a double-pass on the same grating, the total dispersion is zero whenever the beam is reflected. As a result the light is recondensed to the same location as the input 22. In the regions of the mirror 28 where there is no reflective material, the light is lost and does not return to the input 22. A circulator 52 (see FIG. 8) can be used to split the input and output signals in the input fiber, thereby providing a dual port device having transfer function between the input and output which mimics the pattern of the masked mirror. Any angular displacement in the focal plane would have no effect on the dispersion, only on the coupling in the bulk lens if the beams pass through the aperture of the lens.

Figure 8:
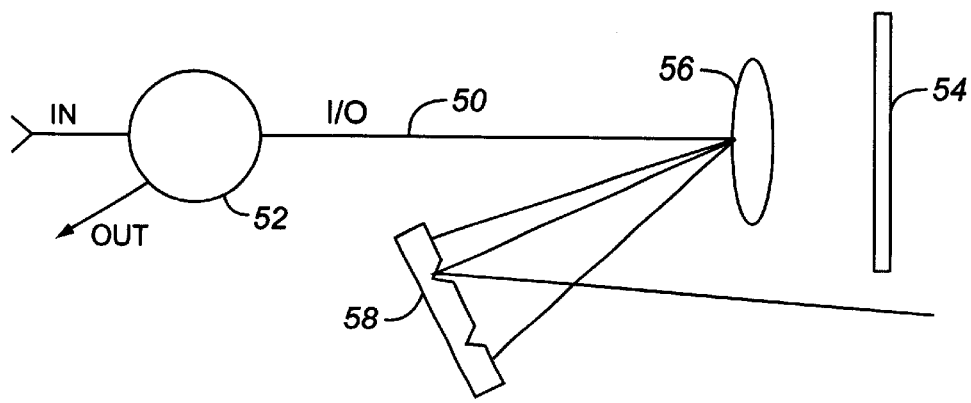
FIG. 8 is a schematic illustration of a double-pass configuration using a single grating in Littrow configuration having a shared input and output separated by a circulator.

The configuration shown in FIG. 8 is based on a double-pass configuration with a single grating in Littrow arrangement. A shared input and output 50 are separated by a circulator 52. Light is directed to a single grating 54 through focusing lens 56. A patterned mirror 58 in the focal plane redirects selected bands of light back to the grating 54 to be recondensed for output at 50. If two gratings 24, 30 are used in Littrow configuration with dispersions D1+D2=0, then the output is separated from the input and there is no need for a circulator.

With one grating in Metcalfe configuration the input and output are again the same. With two gratings in Metcalfe configuration: we want D1+D2=0

Figure 9A:
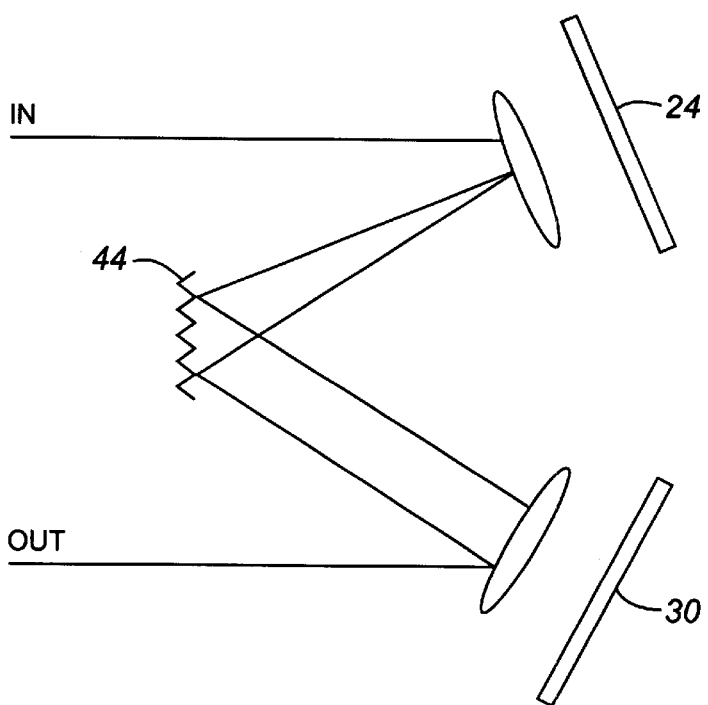
FIG. 9a is a schematic illustration of an embodiment in accordance with the invention including two gratings and a 90 degree v-groove array for local inversion.
Figure 9B:
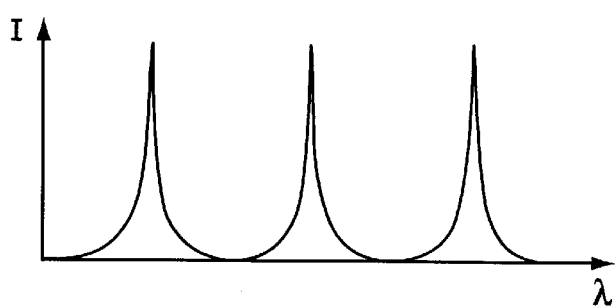

A peaky comb filter has an output response showing full intensity at substantially single wavelengths with strong separation and low noise. In order to create this profile a total dispersion of 0 is needed, whereas the dispersion within individual channel bands is not 0. As seen in FIG. 9a an array of 90 degree V-groove retro-reflector mirrors 44 at the focal plane between two gratings 24, 30, divides the wavelengths into bands, for instance ITU channel width bands, and locally inverts the individual bands. The response profile is illustrated in the graph in FIG. 9b. The total dispersion is D1+D2=0. As a result the spectrum is recondensed into one output fiber. Since wavelengths are inverted with respect to the center of each band, local dispersion in each band equivalent to −D2. As a result, the spectrum is dispersed like D1−D2<>0 within the bands. The inverters can be made of arrays of micro-lenses or 90 degree V-grooves or other retro-reflector prisms. A peaky comb filter in accordance with this embodiment has applications for example, for wavelength monitoring or as a WDM source.

Figure 9C:
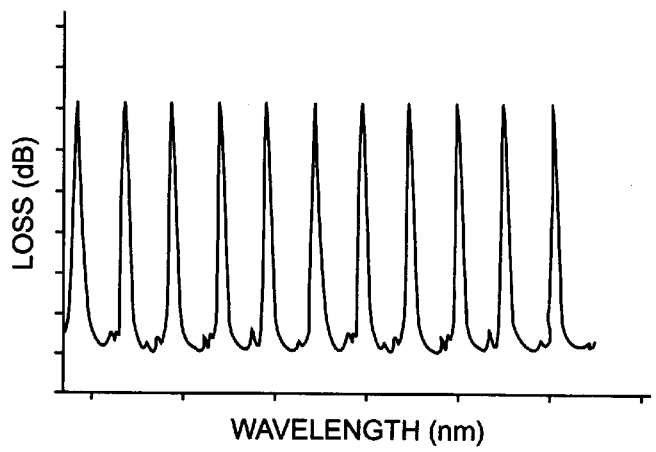

Instead of simply slicing the wavelength bands, inverting these bands before returning the signal to the same grating leads to superimposing double grating dispersion curves. This result is a very peaky comb filter. This local inversion can be made, for example, by using a microlens array 40 glued to a mirror 42 as shown in FIG. 7b. The result is a very high contrast spike comb filter shown experimentally in the graph FIG. 9c. In the graph FIG. 9c, a 250 $\mu$m pitch microlens array was used, leading to 400 Ghz channel spacing, but this could easily be adapted for 100 Ghz, for example. This type of peaky filter can be used for WDM wavelength tracking, or as a WDM source. The 3 dB bandwidth is 210 pm, whereas the 25 dB bandwidht is 685 pm. The rejection is approx. 40 dB.

Figure 10A:
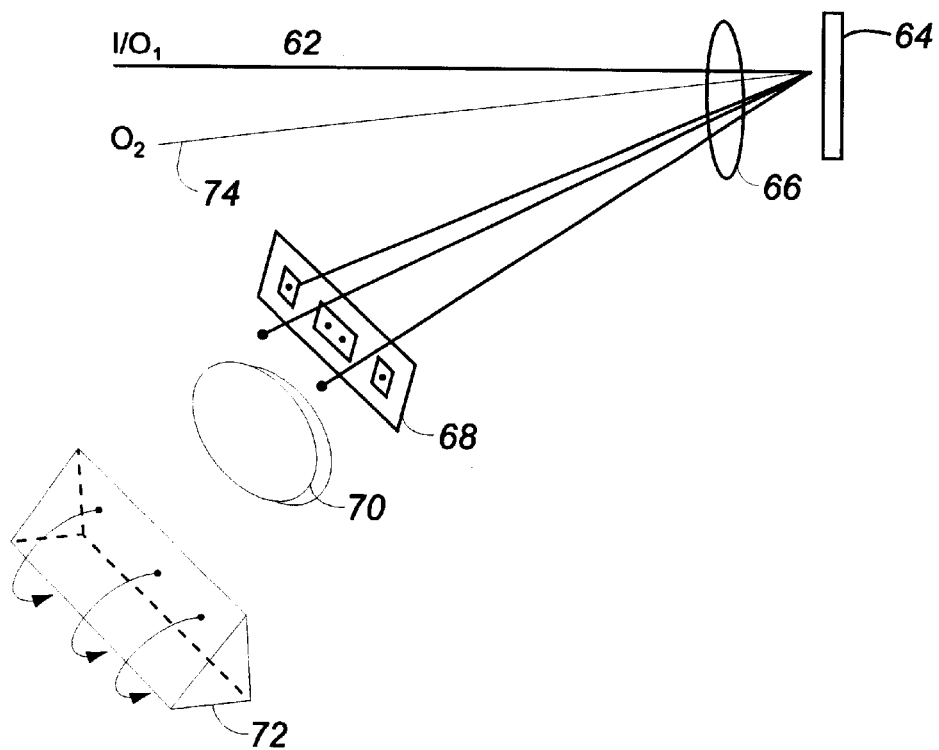
FIG. 10a is a schematic illustration of a further embodiment incorporating a masked retro-reflector mirror and two separate output ports.
Figure 10B:
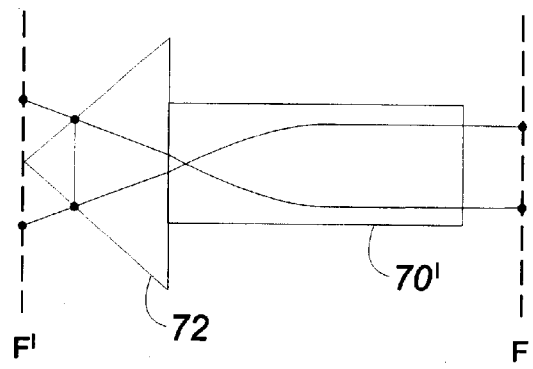
Figure 10C:
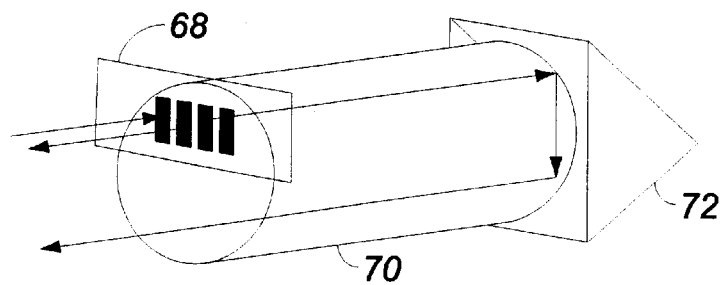
FIG. 10c is a schematic illustration of the configuration in accordance with FIG. 10b.

An add and drop flat-top filter can be made in accordance with the invention using the same masked mirror approach as shown in FIG. 2 for flat top optical filters. An example configuration is shown in FIG. 10a. The mirror 68 is made, for example, by metal deposition on an anti-reflection coated glass substrate. The substrate in this embodiment is made transparent and may be anti-reflection coated so that the light which is not reflected by the mirror is transmitted through. Behind the masked mirror 68, a lens 70 is used to refocus the focused wavelength bands at a different point, a new focal plane. In this new focal plane, a retro-reflector mirror 72 is used to move the beams in a direction parallel to the grating lines. The beams are then re-imaged by lens 70 onto the focal plane F at mirror 68. As a result, the wavelengths that are not reflected by the masked mirror 68 appear to come from below the mask portion of the mirror 68. Therefore, these wavelengths will be recondensed in an other location when experiencing the second dispersion step. A detailed illustration of the mirror 68, lens 70 and retroreflector is shown in FIG. 10c. Each wavelength that is reflected is coupled into the input fiber 62. The others are moved symetrically with respect to the horizontal axis by using a combination of a Selfoc lens 70 (to keep the focus) and a corner cube 72. The input/first output fiber 62 I/O1 is the first output. A circulator (not shown) is needed to split between the input and the first ouput. The second output fiber 74, O2 is below I/O1 62 to collect the wavelengths recondensed to a different location. The separation of outputs enables different selected wavelengths to be directed to different fibers. If a dynamic shutter is implemented, such as LCD, micro-machine, electro-optic effect based deflector, etc., this device enables sorting the wavelengths in two sets. Conveniently, one or more new add channels can be added in the circulator before the first output 62.

In an alternative configuration the corner cube prism 72 used to shift the wavelength bands downwards, can be an inverter prism or lens/mirror association with the plane mirror put in the image focal plane of the lens. The lens is used to refocus the spots in the back of the corner cube. A compact embodiment is shown in FIG. 10b with a corner cube prism 72 glued directly at the back of a graded index (GRIN) lens 70', whose pitch is adjusted so that its input focal plane F is at the masked mirror surface and its output focal plane F' is at the back of the corner cube 72.

Using movable mirrors in the system shown in FIG. 10a instead of a fixed masked mirror 68, a reconfigurable add & drop filter can be made. This can be achieved by using micro-machined mirrors.

As shown for embodiments illustrated in FIGS. 11, 12 and 13 described below, the light launched into an input fiber returns to the same input fiber, without being affected by its vertical position. Hence, multiple input/output fibers can be arranged vertically in the focal plane to simultaneously provide custom optical filter to parallel inputs. Filtering of multiple inputs can be either all automatically aligned in wavelength, or by providing a predetermined lateral offset, shifted in wavelength of a predetermined amount.

Figure 11A:
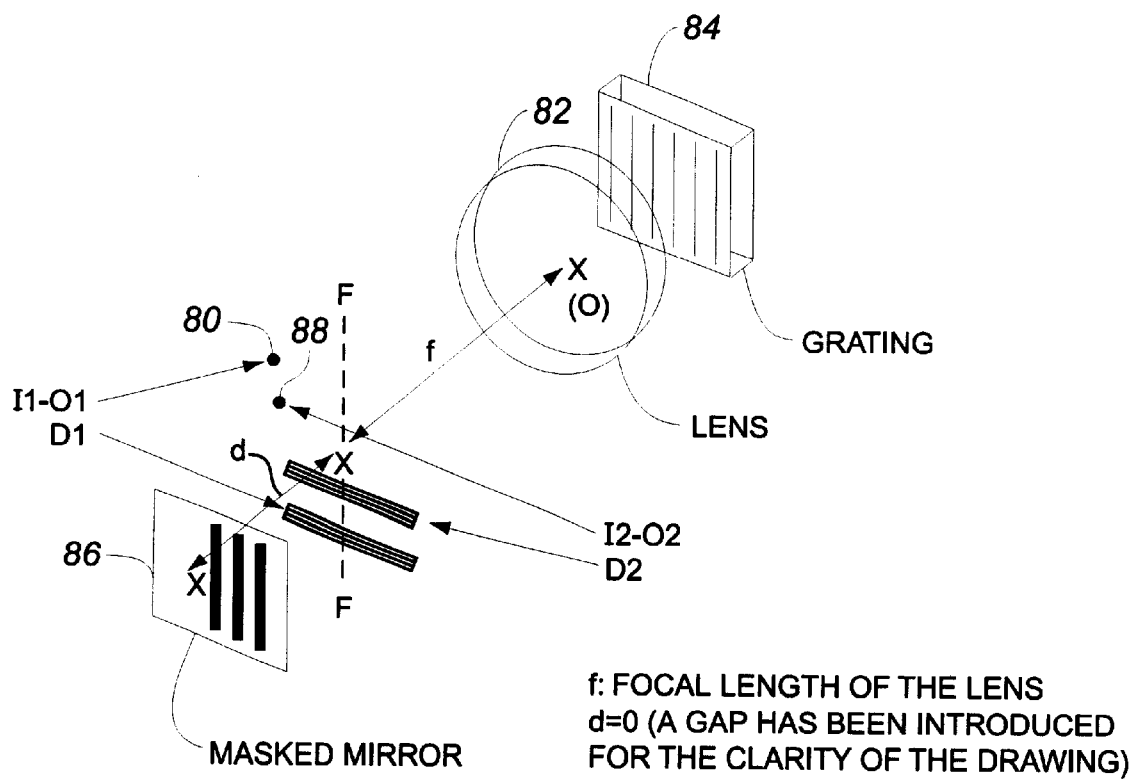
FIG. 11a is a schematic illustration of a multiple input configuration in accordance with the invention.

In the exemplary embodiment shown in FIG. 11a, a two input flat top custom filter is made. In this configuration, the light exiting from the input I1 80 propagates through the lens 82, and is incident on the grating 84 in Littrow configuration. The light is dispersed and returns through the lens 82 to be focused in the focal plane F of the lens 82. When a masked mirror 86 is placed in this focal plane F (an artificial gap has been introduced in the drawing for clarity), having strips of spaced mirrors parallel to the grating lines, only particular slices of the spectrum are reflected. These wavelength bands then pass through the lens 82, and are incident on the grating 84 a second time, and finally are recondensed to the same fiber I1/O1 80. The same path is followed by light exiting from input I2 88 vertically disposed above I1 80.

When the two input/output fibers 80, 88 are exactly aligned with respect to the grating lines and the slits of the masked mirror 86, the dispersion and slicing process is exactly the same for the light launched from I1/O1 and I2/O2. Therefore, a simultaneous double custom flat top optical filter is obtained. This has been verified experimentally.

Figure 11B:
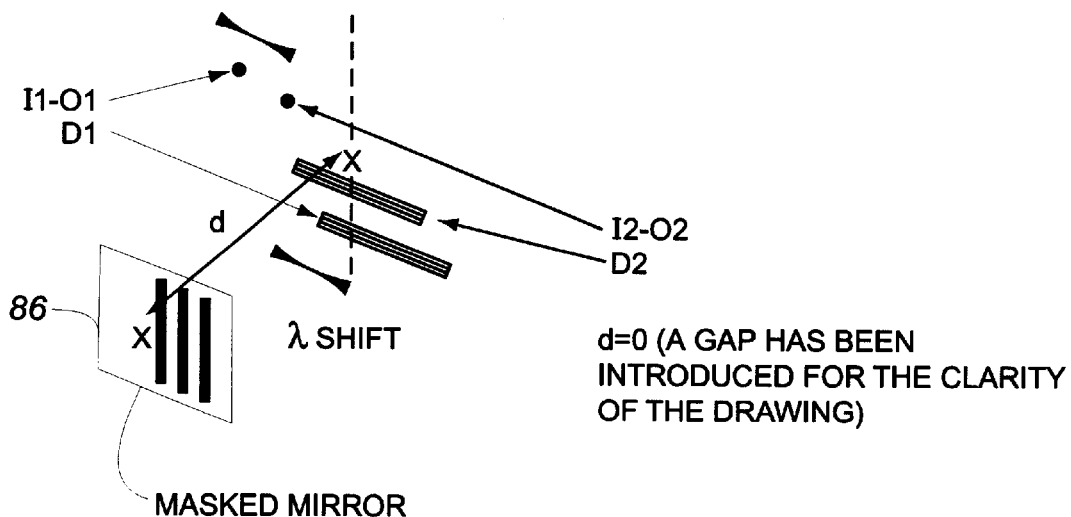

If the input/output fiber array is angled compared to the grating lines and strips of the masked mirror, then a wavelength offset is introduced between the filter response to I1 and I2. This offset can be determined from the physical lateral offset between the fibers 80, 88 (as illustrated in FIG. 11b, a schematic of the focal plane only of FIG. 11a).

Figure 12:
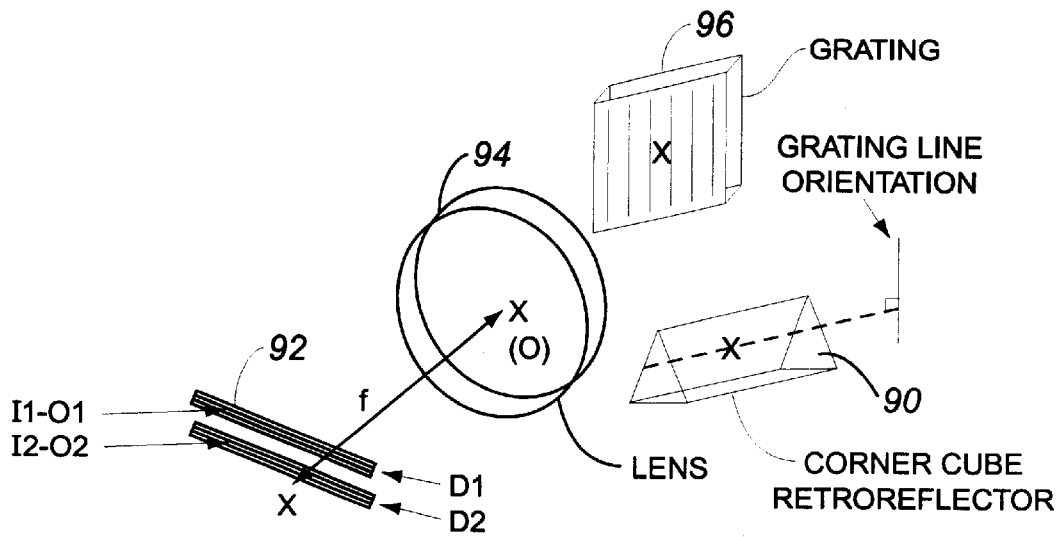
FIG. 12 is a schematic illustration of a peaky filter having an array of multiple inputs where the double pass on the grating is done in the collimated path, rather than in the focal plane; and, FIG. 13 is a schematic illustration of a lasing cavity using the system shown in FIG. 12 and a second input as a filter tuned to the laser wavelength.

The configuration shown in FIG. 12 can be implemented to create, for example, an array of single peak filters. In this embodiment, the double pass on the grating is done in the focal plane or in the collimated path. By processing the collimated beam, the dispersion of the grating is doubled, leading to a very narrow filter response. A corner cube retroreflector 90, whose axis is perpendicular to the grating lines, is used to provide tolerance in the vertical axis. The corner cube retro-reflector 90 returns light to the grating 96 at the same angle, thus returning output light to the input fiber 92. The location of the fiber 92 determines the wavelength of the double dispersed beam which is collected. Multiple input output fibers 92 may be vertically aligned to experience identical filtering. Lateral positioning for each fiber 92 will select the wavelength band. The same can be accomplished in the focal plane by providing a corner cube retro-reflector parallel to the grating lines for globally inverting the dispersed spectrum focused by the lens 94 on the focal plane.

Hence, the light coming from the fiber I1/O1 passes through the lens 94, hits the grating 96, is retro-reflected by the corner cube 90, then hits the grating 96 again, passes through the lens 94 and is focused in the focal plane. Because of the corner cube retro-reflector 90, the dispersed spectrum D1 is automatically at the same vertical position as the input fiber I1/O1 92. Similarly light from each of multiple aligned inputs returns to the same original input fiber. Each input fiber comprises a unique output fiber of the filtered beam. The system can be designed to provide simultaneous filtering to multiple inputs. The wavelength, which is selected, is adjusted either by moving the input/output fiber or by tilting the grating 96. But whatever the tuning, the dispersed spectrum remains automatically at the same height as the input/output fiber.

The two filter responses in the scheme shown in FIG. 12 are at the same wavelength since the input/output fiber array is parallel to the grating lines. More generally again, this array could be angled to obtain a varying offset in the center wavelength of the filter responses to select different wavelength bands collected by the input fiber 92.

Auto-aligned filter cavities are very useful to create a high power tunable laser source. In known embodiments of tunable laser source (as taught in U.S. Pat. No. 5,594,744 and incorporated herein by reference), such a laser is made by using a tunable filter cavity, an amplifying medium and a mirror. The drawback of such lasers is the poor suppression of their spontaneous emission noise, and their relatively low power level (typically a few mW at 1.55 $\mu$m). To boost the power level, typically one uses EDFA, but then the ASE noise from the amplifier is added to the spontaneous noise of the laser, causing the noise level to be even higher. External filtering is then required to remove it. The problem is that the optical filter center wavelength must be precisely aligned with the lasing wavelength in order to correctly eliminate noise. This currently requires expensive and relatively slow tracking filters.

But if the embodiment of the present invention as shown in FIG. 12 is used, it is possible to use one input 92 of the filter to build a lasing cavity, while still using a second input 92 as a filter. Since aligned inputs 92 experience identical filtering this second input is by construction automatically aligned with the laser, whatever the tuning or drift of the cavity.

Figure 13:
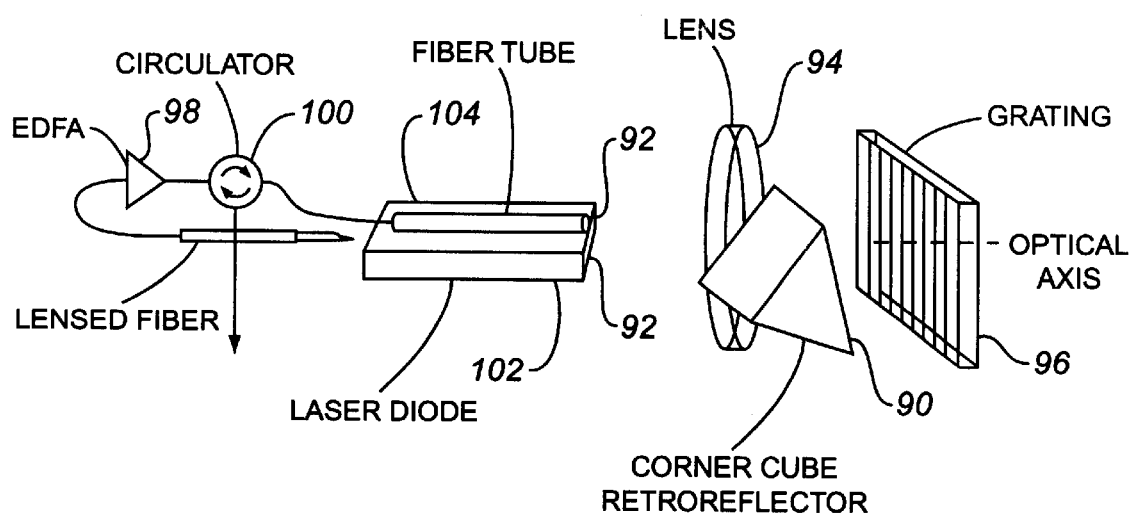

Therefore, a set-up as shown in FIG. 13 can be realized, in which input 92 together with the grating 96 comprises a laser cavity 102 which selects the desired wavelength, and the second input comprises a filter 104 experiencing the same wavelength selected by the grating 96 which is used to suppress the noise from the laser 102 itself and the EDFA 98. The laser cavity 102 and the filter 104 must be connected through a circulator 100 to divide the input and output of the filter 104. This embodiment requires one or more dispersive element 96 (grating, prism, waveguide array, or any other known dispersive medium), a multiple pass arrangement tolerant with the vertical axis (the multiple passing can be done either in the collimated path or in the focal plane), and multiple input/output fibers or waveguides. The vertically tolerant cavity is made by using an horizontal corner cube mirror 90 in the collimated path or a vertical corner cube mirror in the focal plane. The input/output waveguides 92 are placed in the focal plane of the lens 94, in such a way to create automatically wavelength aligned filters, or wavelength offset filters. Numerous alternative embodiments will be apparent to persons of skill in the art without departing from the spirit and scope of the invention as defined in the claims attached.

What is claimed is:

1. An optical filter for filtering at least one input light beam including multiple wavelengths comprising:

a first dispersive element for dispersing a spectrum of the at least one input light beam including means having optical power for focusing the dispersed spectrum;

a processing element in a focal plane of the means having optical power for processing a plurality of predetermined wavelength bands of the dispersed spectrum such that at least one of an intensity and a wavelength order of the wavelength bands are varied in a predetermined manner;

dispersive means selected from the first dispersive element, and a second dispersive element for receiving the processed wavelength bands and providing a second dispersion of the processed wavelength bands for effecting one of condensing the processed wavelength bands, and redispersing the processed wavelength bands; and, at least one output for receiving and outputting the condensed or redispersed wavelength bands from the dispersive means.

2. An optical filter as defined in claim 1, wherein the processing element includes varying transmissive characteristics for processing non-contiguous predetermined wavelength bands of the dispersed spectrum.

3. An optical filter as defined in claim 2, wherein the first dispersive element and the second dispersive element comprise dispersion gratings.

4. An optical filter as defined in claim 2, wherein the processing element displaces selected wavelength bands in the focal plane.

5. An optical filter as defined in claim 4 wherein the processing element further includes means for dividing the spectrum into bands and for locally inverting wavelengths of light centered about a center wavelength within each band.

6. An optical filter as defined in claim 5, wherein the means for dividing the spectrum into bands and for locally inverting wavelengths of light centered about a center wavelength within each band is selected from the group consisting of an array of micro-refractive optical systems; and an array of 90 degree V-groove micro-mirrors.

7. An optical filter as defined in claim 5, wherein the first dispersive element and the dispersive means are gratings of the same order for providing a global inversion of the dispersed spectrum of the at least one input light beam.

8. An optical filter as defined in claim 4 including a retro-reflector in the focal plane of the means having optical power for displacing separated wavelength bands and reflecting the displaced wavelength bands to the dispersion means for dispersion to at least a second output separated from a first output for receiving selected dispersed wavelength bands.

9. An optical filter as defined in claim 8, further including means for adding at least a new channel to one of the outputs.

10. An optical filter as defined in claim 1, wherein the processing element comprises a patterned reflective element.

11. An optical filter as defined in claim 10, wherein the patterned reflective element includes v-grooves for deflecting other wavelengths than the selected wavelength bands away from the dispersion means.

12. An optical filter as defined in claim 1, including multiple inputs spatially disposed relative to the first dispersive element to permit simultaneous filtering of multiple light beams, and multiple outputs disposed to receive condensed or redispersed wavelength bands associated with the multiple inputs, wherein a unique output is designated for each input.

13. An optical filter as defined in claim 12, wherein the multiple inputs are aligned with reference to the dispersive element such that a light beam from each input simultaneously receives substantially identical filtering.

14. An optical filter as defined in claim 12, wherein the multiple inputs are arranged with reference to the dispersive element such that filtering of a light beam from each input is a function of the input arrangement.

15. A optical filter as defined in claim 1 for providing peaky comb filter response wherein the processing element comprises an array of elements selected from 90 degree v-groove retro-reflectors and micro lenses, for dividing the spectrum into wavelength bands and inverting wavelengths within each wavelength band about a center wavelength and for reflecting the inverted wavelength bands;

whereby the total dispersion equals $D1+D2=0$ and the dispersion of each wavelength band equals $D1-D2<>0$, where $D1$ is the dispersion of the first dispersive element and $D2$ is the dispersion of the dispersive means.

16. A tunable laser having an auto-aligned filter comprising;

an input light source for providing an input beam of light;

a tunable filter cavity for tuning a lasing wavelength of an input beam including
- a lens for focusing the input beam of light from the input light source;
- a dispersion grating for dispersing the focused input light beam spectrum; and
- a processing element in the focal plane of the lens including a corner cube retro-reflector having an axis parallel to lines of the dispersion grating for redirecting the dispersed spectrum to the dispersion grating and through the lens to a wavelength filter;

the wavelength filter having an input optically coupled to and aligned with the input light source with reference to the lines of the dispersion grating, for filtering a selected wavelength of the tunable laser from the dispersed spectrum;

an amplifying medium for amplifying the tuned wavelength from the tunable filter cavity and coupling the amplified wavelength back into the tunable filter cavity; and means for separating a tuned laser output from the input beam of light.

17. A method of providing optical filtering comprising the steps of:

dispersing an input beam of light comprising a plurality of wavelengths;

focusing the dispersed input beam;

selecting a plurality of predetermined wavelength bands at the focal plane of the focused dispersed input beam for processing;

processing the selected plurality of wavelength bands to provide modification of at least one of predetermined intensities and wavelength order;

dispersing the plurality of processed wavelength bands to effect one of recondensing the processed wavelength bands and redispersing the processed wavelength bands.

18. A method of providing optical filtering as defined in claim 17 wherein processing is selected from the group consisting of magnification and reduction; inversion; displacement; and reflection and absorption.

19. A method of providing optical filtering as defined in claim 17 further including displacing the position of the plurality of specific wavelength bands at the focal plane, prior to dispersing them again.

* * * * *